United States Patent

Kingston et al.

[11] Patent Number: 5,662,192
[45] Date of Patent: Sep. 2, 1997

[54] BRAKE DISK WITH BUILT-IN ACOUSTIC WEAR-WARNING DEVICE

[75] Inventors: Tim Kingston; Tord Dahlén, both of Eskilstuna, Sweden

[73] Assignee: Volvo Wheel Loaders AB, Eskilstuna, Sweden

[21] Appl. No.: 637,476

[22] Filed: Apr. 25, 1996

[30] Foreign Application Priority Data

May 8, 1995 [SE] Sweden ................... 9501702

[51] Int. Cl.$^6$ ................................................. F16D 66/00
[52] U.S. Cl. ........................... 188/1.11 W; 188/218 XL; 188/264 E; 192/30 W
[58] Field of Search ..................... 188/1.11 W, 218 XL, 188/218 A, 264 E; 192/30 W

[56] References Cited

U.S. PATENT DOCUMENTS

| | | | |
|---|---|---|---|
| 2,516,544 | 7/1950 | Breeze | 188/264 E |
| 3,198,295 | 8/1965 | Fangman et al. | 188/264 E |
| 3,231,058 | 1/1966 | Batchelor et al. | 188/218 XL |
| 3,435,935 | 4/1969 | Warman | 188/218 XL X |
| 4,049,084 | 9/1977 | Beemer et al. | 188/1.11 W |

FOREIGN PATENT DOCUMENTS

| | | |
|---|---|---|
| 29 49 356 | 6/1981 | Germany . |
| 30 27 578 | 2/1982 | Germany . |
| 143372 | 10/1980 | Norway . |

*Primary Examiner*—Peter M. Poon
*Attorney, Agent, or Firm*—Young & Thompson

[57] ABSTRACT

A disk brake comprising a disk (1) which carries on each side a secondary friction layer (7) to which a primary friction layer (6) is affixed, wherein the friction layers (6, 7) are actuable by brake shoes (4, 5), wherein when at least one of the primary friction layers (6) is worn away contact between the secondary friction layer (7) and respective brake shoes (4, 5) will give rise to an indicating sound, and wherein cooling grooves (9) are provided in the primary friction layer (6), wherein each cooling groove (9) extends at least through the full thickness of the primary friction layer (6).

9 Claims, 2 Drawing Sheets

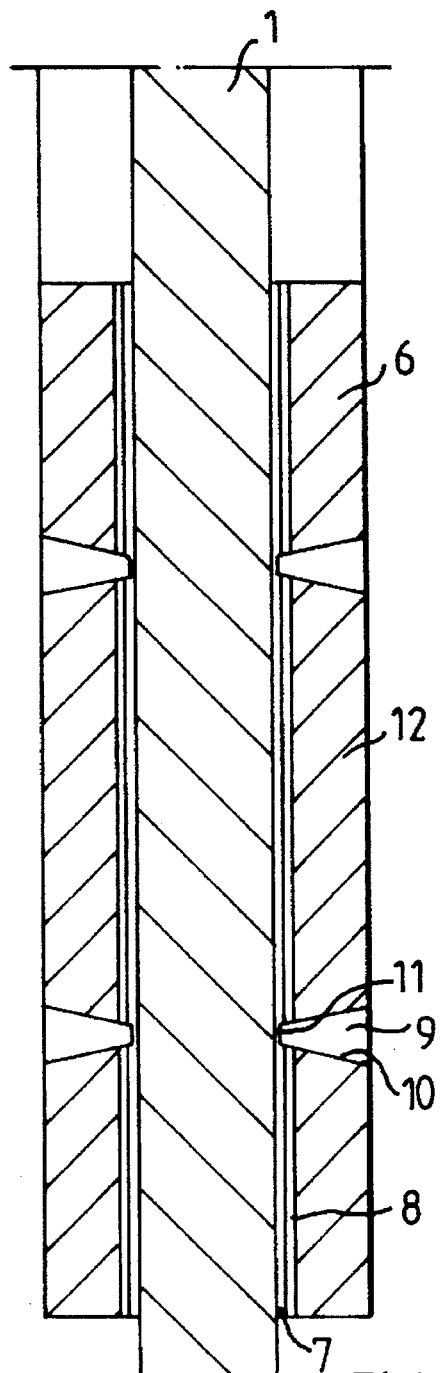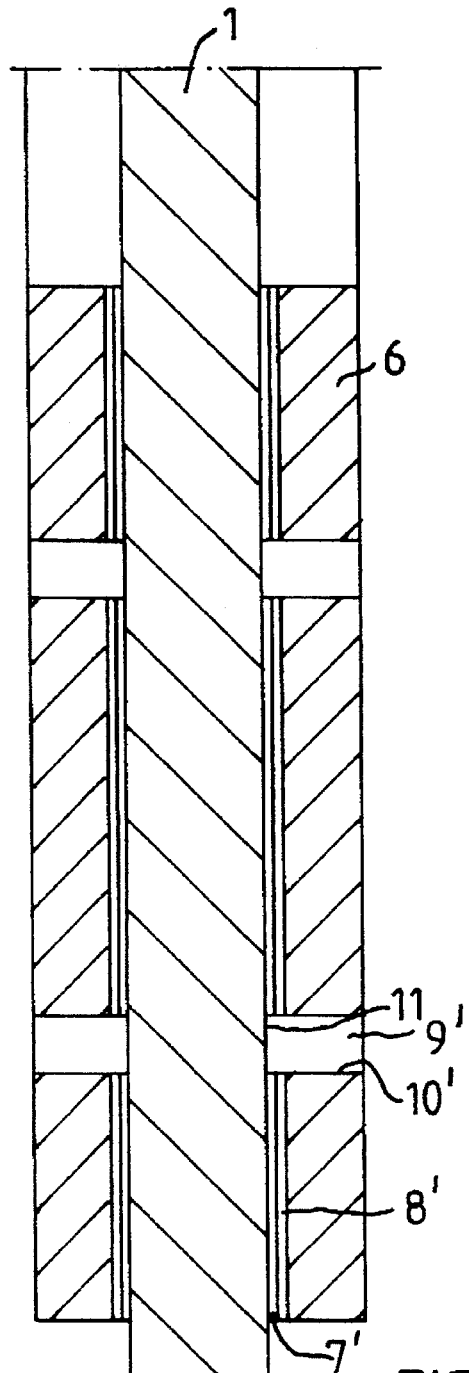

BRAKE DISK WITH BUILT-IN ACOUSTIC WEAR-WARNING DEVICE

FIELD OF THE INVENTION

The present invention relates to a brake disk built-in acoustic wear-warning device, which carries on each side a secondary friction layer to which a primary friction layer is affixed, wherein the friction layers are actuable by force-exerting means, wherein when at least one of the primary friction layers is worn away, contact between the secondary friction layer and respective force-exerting means will give rise to an indicating sound, and wherein cooling grooves are provided in the primary friction layer.

DESCRIPTION OF THE PRIOR ART

Friction brakes experience wear on those surfaces that have contact with one another when the brakes are applied, due to the relative movement between the surfaces. One of the mutually abutting surfaces is normally provided with a friction lining. This friction lining is gradually worn away by the brake surface that is pressed into contact therewith it is important that heat is led away from the friction lining effectively, since linings that are heated to high temperatures will wear significantly and since the friction index normally decreases with temperature. A worn friction lining will greatly impair the performance of the brakes. At the same time, contact occurs between the component that carries the lining, for instance a disk, and the surface in abutment therewith, generating considerable heat and wearing away metal particles that can have a catastrophic effect on the brakes and associated components.

The surface of the friction lining is grooved or channeled so as to obtain an effective brake-cooling effect. Heat is conducted away from the friction lining, by causing the brakes to operate in liquid, such as oil, which flows through said grooves.

Because friction brakes that operate in a liquid are by virtue of their function and design encapsulated, it is difficult to check whether the lining is worn out.

In order to provide an indication of when the primary friction layer is worn down, a secondary friction layer may be disposed between the primary friction layer and the disk, so that when the primary friction layer becomes worn and the surface in pressured abutment therewith comes into contact with the secondary friction layer, vibrations that generate an audible sound will occur.

One such wear-warning device is illustrated and described in U.S. Pat. No. 4,049,084, where a brake disk is provided with a sound-generating, paper-like secondary friction layer which is exposed and comes into contact with a pressure element when the primary friction layer has worn away. Such contact results in an audible sound which indicates that the primary friction layer is worn. The sound-generating secondary friction layer is applied to the brake disk or the clutch plate in the form of a ring or in the form of segments or in a punctiform manner. The primary friction layer may be provided with grooves or apertures that will enable the liquid to circulate and therewith improve cooling of said layer.

One drawback with wear-warning devices of the kind described in the aforesaid patent specification is that the depth of the grooves or apertures reaches only to about half the thickness of the primary friction layer. When the primary friction layer is worn down to the depth of the groove, the temperature of the primary friction layer will increase to a level at which the remainder of said layer will wear away very quickly. This elevated temperature is also liable to damage the sound-generating secondary friction layer and therewith impair the sound-indicating and braking effect.

SUMMARY OF THE INVENTION

The main object of the present invention is to provide a brake disk with a built-in acoustic wear-warning device which will provide a reliable sound indication with retained braking power when the primary friction layer of a friction brake is worn down.

Another object of the present invention is to provide a brake disk which has a longer working life.

Still another object of the invention is to provide a brake disk from which heat is effectively dissipated.

To these ends, there is provided in accordance with the present invention a brake disk with built-in acoustic wear warning device, wherein each cooling groove extends at least through the full thickness of the primary friction layer.

Further features of the invention are set forth in the following dependent Claims.

BRIEF DESCRIPTION OF THE DRAWINGS

The invention will now be described in more detail with reference to exemplifying embodiments thereof and also with reference to the accompanying drawings, in which

FIG. 3 is a sectional view of part of the brake disk shown in FIG. 2 in accordance with a first embodiment, said view being taken on the line A—A in FIG. 2; and FIG. 4 is a sectional view of part of the brake disk in FIG. 2 according to a second embodiment, said view being taken on the line A—A in FIG. 2.

DESCRIPTION OF THE PREFERRED EMBODIMENTS

Figure 1:
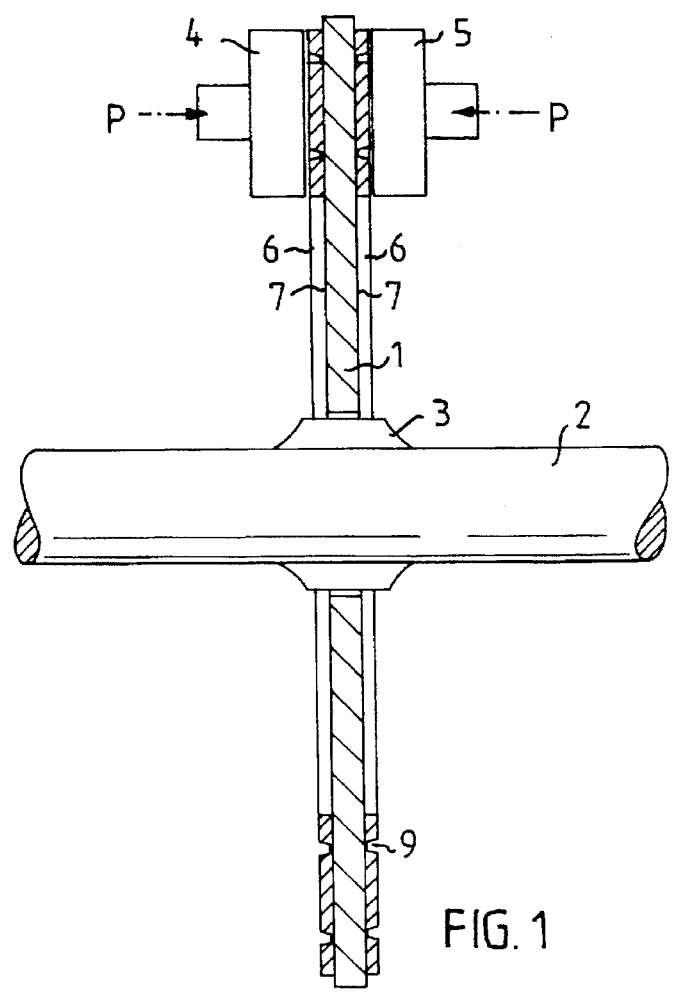
FIG. 1 is a partial sectional view of a friction brake.

FIG. 1 shows a friction brake with a brake disk 1 mounted on a shaft 2, which may be the driving shaft of a vehicle. The disk 1 is mounted on the shaft 2 with the aid of a spline coupling 3, therewith enabling the disk 1 to move axially in relation to the shaft 2. Friction layers divided into primary and secondary layers 6 and 7 are applied onto both sides of the disk 1. A pair of brake shoes 4, 5 are intended to be pressed against the primary friction layer 6 with a force P when the brake is applied to retard the rotating disk.

The brake shoes 4, 5 may, for instance, be comprised of a movable and a fixed brake shoe, where the fixed brake shoe then forms a counterpressure surface. The brake shoes 4, 5 may abut the friction layers 6 in a punctiform manner, as shown in FIG. 1, or as an annulus which covers the whole of the surface of respective primary friction layer 6.

Figure 2:
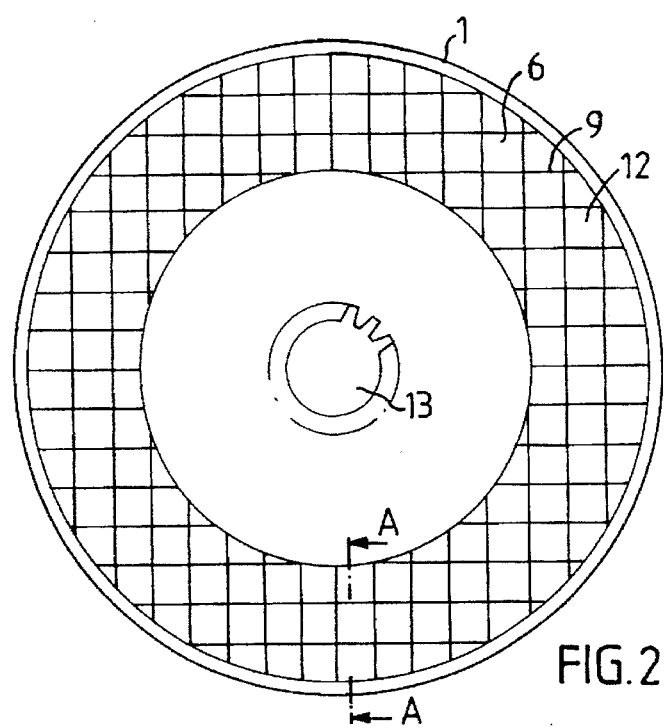
FIG. 2 is a side view of a brake disk.

The friction layer 6, 7 are provided with cooling grooves or channels 9. The cooling grooves 9 may be disposed cross-wise as illustrated schematically in FIG. 2, although other patterns are conceivable. The cooling grooves 9 thus divide the friction layers 6, 7 into a plurality of segments 12. The friction layers 6, 7 may be applied to the disk 1 in the shape of a ring as illustrated in FIG. 2, although they may also be applied to the disk in the form of sectors. The disk 1 illustrated in FIG. 2 has a toothed centre hole 13.

FIG. 3 is an enlarged sectional view of part of the disk 1 of FIG. 2, taken on the line A—A. A secondary friction layer 7 is disposed between the primary friction layer 6 and the disk 1. The secondary friction layer 7 may be a layer of bronze that is sintered directly on the disk 1. The primary friction layer 6 is adhesive bonded to the secondary friction layer 7 as shown at 8.

The cooling grooves 9 extend through the full thickness of the primary friction layer 6 and through the adhesive layer 8 and into the secondary friction layer 7 to a depth which corresponds preferably to at least 80% of the thickness of the secondary friction layer 7. In the case of the FIG. 3 embodiment, the walls 10 of the cooling grooves 9 are convergent in a direction towards the disk 1. The bottoms 11 of the cooling grooves 9 may be flat or pointed, for instance.

In the case of the FIG. 4 embodiment, the cooling grooves 9' have parallel walls 10' which are orientated at right angles in relation to the rotational plane of the disk 1. In order to provide satisfactory cooling of the secondary friction layer 7 when the primary friction layer 6 and the adhesive layer 8 are worn away, the grooves or apertures 9' may extend through the full thickness of the secondary friction layer 7 such that the bottoms 11 of the grooves 9' will be defined by the disk 1.

Because the cooling grooves 9, 9' extend through the full thickness of the primary friction layer 6, satisfactory cooling will be achieved throughout the whole of the wearing process of the primary friction layer 6. This results in a constant wear rate, therewith extending the total useful life of the primary friction layer 6.

Because the cooling grooves 9, 9' also penetrate into the secondary friction layer 7, reliable cooling is also achieved when the primary friction layer 6 has been completely worn away. This ensures that the braking power will be retained even when the primary friction layer 6 is completely worn away.

When the primary friction layer 6 has been completely worn away, and respective brake shoes 4, 5 come into contact with the secondary friction layer 7, there occur vibrations which generate audible sound and therewith indicating that the brake disk 1 must be replaced.

The secondary friction layer 7 may be comprised of a pulverized bronze material applied to the brake disk 1, said powder being heated under pressure to form a sintered bronze layer. An adhesive coating is then applied to the bronze layer so as to affix the primary friction layer 6 to the secondary friction layer 7. Cooling grooves or channels are then, e.g., cut through the primary friction layer 6, the adhesive layer 8 and into the secondary friction layer 7.

We claim:

1. A disk brake comprising:

a disk;

a secondary friction layer applied to each side of said disk;

a primary friction layer affixed to each secondary friction layer, said secondary friction layer being disposed between the primary friction layer and the disk, said friction layers being applied to the disk in a ring shape, said friction layers being adapted to be actuated by force-exerting means;

cooling grooves provided in the primary friction layer, each of said cooling grooves extending through a full thickness of the primary friction layer and into the secondary friction layer;

whereby when at least one of the primary friction layers is worn away, contact between the secondary friction layer and respective force-exerting means will give rise to an indicating sound.

2. A disk brake according to claim 1, wherein each cooling groove extends into the secondary friction layer, to a depth of at least 80% of the thickness of said secondary friction layer.

3. A disk brake according to claim 2, wherein each cooling groove extends through the full thickness of the secondary friction layer.

4. A disk brake according to claim 1, wherein the mutually facing walls of each cooling groove converge in a direction towards the disk.

5. A disk brake according to claim 1, wherein the mutually facing walls of each cooling groove are parallel.

6. A disk brake according to claim 1, wherein the secondary friction layer is comprised of bronze material.

7. A disk brake according to claim 6, wherein the bronze material is sintered on the disk.

8. A disk brake according to claim 1, wherein the primary friction layer is comprised of a friction lining that contains paper material.

9. A disk brake according to claim 1, wherein the primary friction layer is adhesive bonded to the secondary friction layer.

* * * * *